Patented Apr. 1, 1941

2,236,545

UNITED STATES PATENT OFFICE 2,236,545

CELLULOSE GLYCOLIC ACID

Robert William Maxwell, Wilmington, and Louis Leonard Larson, Newark, Del., assignors to E. I. du Pont de Nemours & Company, Wilmington, Del., a corporation of Delaware No Drawing. Application October 8, 1938,
Serial No. 233,952

8 Claims. (Cl. 260—231)

This invention relates to a new group of cellulose ethers, and more particularly to a heretofore unknown series of cellulose glycolic acids.

Two series of cellulose glycolic acids are known in the prior art. One of these includes the cellulosic products which are soluble in caustic alkalies but insoluble in water, as the alkali metal salts. The other group includes products which are soluble in water in the form of the alkali metal salts.

It has now been discovered that there is still another type of cellulose glycolic acid. This is surprising because it seems apparent from the language of U. S. P. 1,682,292 that the patentee thereof believed he had covered all the possible cellulose glycolic acids except those disclosed in British Patent 138,116.

This invention had for an object the preparation of a new type of glycolic acid ether of cellulose. Other objects were the preparation of a new type of cellulose glycolic acid which is soluble in water as the sodium salt, and the preparation of a cellulose glycolic acid of much greater suitability for the preparation of greaseproof paper than the cellulose glycolic acid ethers known to the prior art. A general advance in the art, and other objects which will appear hereinafter, are also contemplated.

In general the present invention is carried out by substituting and degrading cellulose (although a combined substitution and degradation reaction in which the major portion of the degradation takes place simultaneously with substitution is commonly employed, it is sometimes advantageous to degrade the cellulosic body before or after the substitution reaction), and coordinating the effects thereof so that a cellulose ether is obtained which is not precipitated from its alkaline solutions in concentrations of less than .5% when treated with an agent which neutralizes the alkali, but which is precipitated from its alkaline solutions by agents which neutralize the alkali when the neutralization is effected in concentrations of greater than 2%. Ordinarily the etherification reaction, that is, substitution and degradation or degradation, is continued until a cellulose glycolic acid of the aforementioned solubility characteristics is obtained, and then the reaction is stopped. In one convenient modification of the invention the etherification reaction conditions are regulated so that the degradation continues after the substitution has ceased, as for example, by limiting the amount of etherifying agent present (during the etherification reaction) to such an extent that the desired solubility characteristics have not been obtained at the time the etherifying agent is exhausted. In any case, both substitution and degradation are stopped before a cellulose glycolic acid which in the form of the dry sodium salt can be dissolved in water by gentle agitation without the application of unusual shearing force, is produced.

A convenient method of carrying out the aforementioned process is to steep the cellulose in an aqueous caustic alkali solution, and after thorough saturation has occurred, to express the excess and then mix the resultant alkali cellulose with a mono-halogen derivative of acetic acid in a mixer of the Werner-Pfleiderer type. When the proper degrees of etherification (substitution) and degradation have been obtained, there results low substituted cellulose glycolic acid ethers, the sodium salts of which in dry form cannot be dispersed in water by ordinary agitation means, but which can be formed into an alkali-free aqueous solution or gel in a colloid mill at concentrations of up to 1.0%, which gel when diluted with water forms neutral, smooth solutions.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

While maintaining a temperature of 25° C., 1,000 parts of sulfite wood cellulose in the form of sheets were steeped for 1 hour in 10,000 parts of a 23% solution of sodium hydroxide. The sheets were pressed to a weight of 3,000 parts in an hydraulic press and then placed in a Werner-Pfleiderer shredder. The shredding of the sheets was started and continued for 1 hour, after which 720 parts (1 mol) of dry sodium chloroacetate were added and mixing continued for a period of 6 hours at 25° C. The contents of the shredder were then removed and stored at 25° C. for 24 hours.

The product thus obtained was purified by suspension in methanol containing enough acetic acid to make the mixture neutral to phenolphthalein, after which it was washed several times with 70% methanol and dried. The dry product was readily soluble at a concentration of 5% in 5% sodium hydroxide at room temperature giving excellent practically fiber-free solutions. The sodium cellulose glycolate was not precipitated from these solutions after dilution with water to 0.3% (based on the cellulose present) when made neutral to phenolphthalein with 5% acetic acid.

Some of the dried purified material (the sodium salt of the glycolic acid ether of cellulose) was suspended in water and stirred vigorously by hand. It gelatinized to a considerable extent, but did not dissolve even when 999 parts of water were present for 1 part of the cellulose derivative. This suspension was then passed through a colloid mill (Travis type) with the result that an excellent solution (1/10%), substantially 100% of which could be filtered through filter paper, was formed.

Another suspension of purified material in which the concentration was 1% was passed through the colloid mill, whereby a gel was formed. This gel upon dilution with water formed a smooth solution.

A 2% solution of the product in 5% sodium hydroxide upon neutralization gave a gel which would not form a smooth solution upon high dilution.

*Example II*

One thousand (1000) parts of sulfite wood cellulose were steeped for 1 hour at 25° C. in 10,000 parts of a 30% solution of sodium hydroxide. The sheets were pressed to a weight of 3200 parts, after which they were shredded for 1 hour in a Werner-Pfleiderer shredder. Fifteen hundred (1500) parts of sodium chloroacetate were then added and the shredding continued while maintaining a temperature of 25° C.

A sample of the reaction mixture was withdrawn after 5 hours and tested for solubility. It was found to be soluble in dilute caustic alkali at ordinary normal room temperature, but was insoluble in water.

After 13 hours (8 hours after the first sample) a second sample was withdrawn and tested for solubility. It had a solubility corresponding to that of the product produced according to the process of Example I.

After the withdrawal of the second sample the shredding operation was stopped and the reaction mixture stored for 64 hours at 25° C. It was then purified and tested for solubility. This product was easily soluble in water in concentrations of 10%.

*Example III*

A cellulose glycolic acid was prepared according to Example I. It was soluble in 5% aqueous sodium hydroxide solutions at ordinary temperatures but was not precipitated therefrom upon neutralization when the concentration of the cellulose glycolic acid was less than 0.5%. In the purified form its sodium salt was insoluble in water in concentrations of less than 0.5% when subjected to ordinary hand agitation. A 1% neutral aqueous gel of the sodium salt of the cellulose glycolic acid was prepared by passing a mixture of the components through a colloid mill.

This 1% gel was applied to a paper pulp (in the beater) in an amount such that the sodium cellulose glycolate was equal to 1% of the pulp (calculated on a dry basis) and thereafter the cellulose glycolic acid product precipitated (on the pulp) by the addition of ordinary alum to a pH of 5.5 The pulp was formed into sheets, pressed, treated with 0.1% ammonium hydroxide, and dried.

The sheets were tested for resistance to penetration by turpentine. It required 385 minutes for penetration to take place. This is an accurate measure of greaseproofness.

The 13 hour product of Example II gives substantially the same results when utilized in the manner described in this example. The 64 hour product of Example II, when treated in the manner described above, gives a sheet material which is penetrated by turpentine in from 3 to 6 minutes. The 5 hour product of Example II, when treated as above described, yields a sheet material which is penetrated by turpentine in from 3 to 12 minutes.

*Example IV*

A ten pound capacity beater was charged with a bleached Mitscherlich sulfite pulp (65-70% dry) at 1.9% fiber consistency (per cent solids, i. e., dry weight fiber), with the beater roll set to fibrillate without much cutting. The pulp was beaten until it was nine times as free as glassine paper pulp (77 seconds by the freeness test described below). To this pulp a sufficient amount of a 1.0% solution of the sodium cellulose glycolate (pH 6.8) of this invention was added to give the ratio of film-former indicated in the following table. A sufficient amount of a 5% water dispersion of titanium dioxide was added to give 2% titanium dioxide based on fibers. After thorough mixing with the pulp enough alum solution was added to precipitate the sodium cellulose glycolate. After complete mixing, the pulp slurry was at a pH of 4.5. The slurry was reduced with water to a paper making consistency and sheets of 43-pound basis weight (25 x 38 x 500 ream) were formed. The control sheets were pressed and dried at 100° C. without any surface treatment with swelling agent. Additional control sheets were formed in the same way from the same pulp before the sodium cellulose glycolate and alum were added. The remainder of the sheets, after couching from the forming wire, were passed through a solution of swelling agent while supported by the couching felt. These were squeezed to 40% sheet dryness, and then they were dried at 100° C. The temperature of the swelling solution was 25° C.

These sheets that were given the swelling agent treatment, in addition to the high turpentine resistance, recorded herein, have a very high wet strength and translucency resembling parchment paper but the fiber identity is not destroyed.

| Percent Na Cell. glycolate based on fiber weight in sheet | Swelling agent | Concentration of swelling agent | Turpentine resistance |
|---|---|---|---|
| | | Percent | Minutes |
| None | None | | 0.5 |
| 1.0 | do | | 1.1 |
| 1.0 | NH₄OH | 0.20 | 744.0 |
| 1.0 | NH₄OH | 0.35 | 420.0 |
| 1.0 | NH₄OH | 0.50 | 126.0 |
| 2.0 | None | | 2.0 |
| 2.0 | NH₄OH | 0.10 | 7,500.0 |
| 2.0 | NH₄OH | 0.20 | 7,500.0 |
| 2.0 | NH₄OH | 0.35 | 7,900.0 |
| 2.0 | NH₄OH | 0.50 | 10,000.0 |
| 2.0 | NaOH | 0.10 | 8,200.0 |
| 2.0 | NaOH | 0.05 | 7,500.0 |

The sodium cellulose glycolate was made as follows:

One hundred twenty (120) parts of bleached sulfite pulp were steeped in 1200 parts of 25% sodium hydroxide for one hour, after which the sheets were pressed to 360 parts, mixed in a Monel metal Werner & Pfleiderer shredder for sixteen hours at 20° C. with 90 parts of dry sodium chloroacetate. To stop the reaction and viscosity reduction of the cellulose derivative by oxygen in the air, the resulting unpurified product was mixed with sufficient water to give an 8% cellulose consistency. It was then diluted with 9490 parts of water and 1010 parts of 5% solution of sulfuric acid to give a 1% solution of sodium cellulose glycolate at pH 6.8.

A complete description of the construction of the tester used for measuring pulp freeness is given in U. S. Patent No. 1,857,100. The procedure used for measuring pulp freeness on this tester follows: Referring to the drawing in the patent of reference, the cup 18 is filled with water until it flows out the pipe 19 which fixes the water level in the cup even with the top of the screen 20. The stop-cock 19 is then closed and a dispersion of the pulp (1.0 gram bone dry weight of fiber and 999.0 grams of water at 25° C.) is poured into the glass tube 21. The stopper 22 is promptly removed and as the level of the pulp dispersion passes the 41 cm. mark 23, the stopwatch is started. As it passes the 31 cm. mark (that is, after a fall of 10 cm. from the 41 cm. mark) the watch is stopped. The elapsed time is the freeness of the pulp.

*Example V*

To a beater furnish consisting of 60 parts bleached soda pulp, 15 parts bleached sulfite pulp and 60 parts calcium carbonate (all on air dry basis) was added 100 parts of a 1% solution of the sodium cellulose glycolate of Example I at a pH of 6.8. When the sodium cellulose glycolate was mixed thoroughly with the beater furnish, 65 parts of a 3% solution of paper-maker's alum were added. This mixture was diluted further with water to a consistency of 0.3%, it was formed into sheets on a hard mold, and squeezed to 30% sheet dryness. These sheets were then treated with a 0.4% solution of ammonium hydroxide (swelling agent) pressed to 36% dryness and dried on a steam heated drier.

The dried sheets (50 lbs. basis weight for 25 x 38 x 500 ream) had a water resistance of 8 seconds, a turpentine resistance of 16 seconds, and Mullen bursting strength of 42 pounds. The chalk content of the sheets was 25%.

*Example VI*

A mixture of coating clay (100 parts) and water (130 parts) was stirred until a smooth paste was formed. To this was added a mixture prepared by combining water (107 parts) with a solution (107 parts) formed by diluting the reaction mixture of Example I to 4.2% cellulose and mixing until a smooth solution resulted. The pH of the mixture was then reduced to 8.5 by adding gradually by stirring approximately 16.2 parts of 10% sulfuric acid. Two (2) parts of 37% formaldehyde were stirred into the mix to act as a preservative. The solution was then worked through a 100 mesh sieve, and thereafter converted to a soluble form of the aluminum salt by adding thereto for each 100 parts of the above mixture 4 parts of a 7.3% solution of paper-maker's alum, followed by 0.2 part (per 100 parts of the said mixture) of aqueous ammonia of 57% concentration calculated as ammonium hydroxide. Alum solution and ammonium hydroxide solution of the aforementioned concentrations were then added in the following order:

|  | Parts |
|---|---|
| Alum | 2.5 |
| Ammonium hydroxide | 0.3 |
| Alum | 1.5 |
| Ammonium hydroxide | 1.5 |
| Water | 2.5 |

The product was stirred vigorously throughout the addition, after which it was ready for coating. When applied to paper in the usual way as a paper-coating composition followed by drying, an excellent binding effect (of the clay to the paper) was obtained. Surprisingly, only about ⅓ as much of the sodium cellulose glycolate of this invention was required to bring about a binding effect equivalent to that obtained with a good grade of casein. The resistance to the removal of the pigment by wet abrasion was equivalent to that of the best casein-formaldehyde combination.

According to the latest information, cellulose has the structural formula:

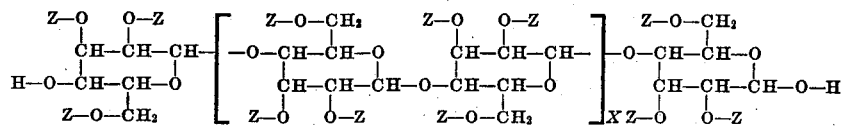

in which "Z" represents a replaceable hydrogen atom and "X" is a large integer (in natural cellulose it is in the neighborhood of 1000). Although this formula appears involved, the chemical structure of cellulose is quite simple. It can readily be seen from the formula that cellulose is composed of glucose residues (joined end to end), every other one being reversed in position (i. e., twisted 180° about the lengthwise axis). In chemical reactions the behavior of cellulose (in general) is that of the glucose residues which it comprises. For this reason it is customary to refer to cellulose in terms of "glucose units" or "$C_6$ units" (glucose having 6 carbon atoms). The actual value of "X" in the above formula is very difficult to determine, but stoichiometrical calculations for cellulose are made quite simple by calculating cellulose as glucose. This is an accurate mode of calculation, because as indicated above, cellulose behaves similarly to glucose. This is especially true in substitution reactions.

The commonest chemical changes which can take place with cellulose without destroying its general structure are substitution and degradation. By substitution is meant the replacement of the replaceable hydrogen atoms (each glucose unit has three such atoms as indicated by "Z" in the above formula) with other radicals. Degradation is the term which has been adopted in the art to cover the shortening of the cellulose molecule chain. When some of the glucose units are broken away, degradation has taken place. This breaking off of glucose residues (degradation) causes "X" in the above formula to become a smaller number than it was when the cellulose was in its original condition.

The value of "X" in the above formula is almost impossible of exact determination. The state of degradation (depolymerization) cannot, therefore, be practically expressed in direct units such as numerical values. Since the chief effect of degradation is to increase the solubility of the cellulose molecule in aqueous solvents, and since this solubility varies directly with the degree of degradation, it is customary in the viscose industry to express degradation in terms of solubility. A cuprammonium solution having well defined properties has been adopted by the industry as a standard solvent.

The cellulose ether art unfortunately, perhaps, is a less highly developed art than the cellulose regeneration art. Furthermore, up to the present time no solvent, aqueous or otherwise, has been found which will dissolve all cellulose ethers. As a result, there is no known standard applicable to all cellulose ethers by which their degradation can be compared. This has made it necessary for each investigator to adopt a solubility standard which fits (or satisfactorily meets the needs of) his particular work.

Some degradation always accompanies substitution (etherification). This degradation can be minimized or otherwise controlled (if desired) by regulating the conditions and time of the etherification reaction. The term "etherification reaction" as used herein involves and covers not only etherification in the sense of substitution, but also the accompanying degradation. The amount of such accompanying degradation which takes place depends upon such factors as the type of cellulose, the purity of the ingredients, the time the reactants are in contact, the temperatures employed, and the like.

The outstanding distinguishing characteristic of the cellulose glycolic acids of this invention is their peculiar solubility. This solubility is a function not only of the number of glycolic acid ether groups (radicals) which have been introduced into the cellulose molecule (the degree of etherification of the cellulose nucleus), but also the size (length) of the cellulose molecule (the degree of depolymerization of the cellulose nucleus).

Various combinations of substitution and degradation (the exact combination being immaterial except as a matter of convenience and economy) give products having the solubility characteristics of this invention. It is not possible to characterize the new cellulose glycolic acids by either of these qualities (substitution and degradation) alone. This fact may be emphasized by pointing out that it is possible to produce a cellulose glycolic acid which is soluble only in aqueous caustic alkali, another which is soluble (at fairly high concentrations) in water, and still another which possesses the solubility of the products of the present invention, all three of which have the same degree of substitution. In preparing the cellulose glycolic acid ethers of the present invention, it is necessary, therefore, to coordinate (as for example, by control of the quantities of reagents, time and temperature of reaction and the like) the two variables, degradation (depolymerization) and substitution (etherification) encountered in cellulose etherification.

Most of the products of the present invention contain from 0.3 to 1.5 glycolic acid ether groups per glucose unit of the cellulose, and in general, products which fall without this range of substitution are outside the limits of this invention. A cellulose glycolic acid alkali metal salt will possess the solubility characteristics of this invention at various degrees of degradation, depending upon the degree of substitution.

Sulfite wood cellulose is the preferred cellulosic source material, but the other types of chemical cellulose are suitable for the reaction. One reason for this preference is that products of the desired solubility are obtained much more readily with sulfite wood cellulose as a raw material, but this reason may be offset by economic reasons in some instances. Under such circumstances the more common materials of this type, such as cotton linters, soda pulp, bagasse pulp, and the chemically modified celluloses such as hydrocellulose, oxy-cellulose and cellulose hydrate, may be found suitable. Cellulose partly substituted with glycolic acid or other hydrophilic ether groups may be used satisfactorily as a starting material. Mixtures of cellulosic source materials are also considered within the purview of the present invention. These products may be used either air dry or bone dry.

Any of the caustic alkalies may be used in carrying out the invention. Sodium hydroxide is preferred because it is cheaper, and is the most satisfactory because it exerts a more powerful swelling action on the cellulose. With this caustic alkali the products obtained are usually of most excellent solubility characteristics. Special mention may be made of potassium hydroxide and the quaternary ammonium bases. The various caustic alkalies are used in equivalent molecular proportions.

Products of satisfactory solubility for many uses can be obtained where the caustic soda concentration of the etherification mixture is varied over the range of from 10% to 40%. The most satisfactory solubility characteristics, however, have been obtained when the caustic soda in the solution at the beginning of the reaction is present in such a quantity that with the water present it equals a solution of 18% to 30% in concentration. Products of the best solubility have not been obtained either above or below this preferred concentration range.

Alkali metal salts of the monohalogen acetic acids such as the sodium or potassium derivatives of monochloroacetic acid and monobromoacetic acid are the preferred etherifying agents, although the free acids or other derivatives such as the organic (carbon compound) esters, amides and nitriles operate satisfactorily. The alkali metal salts have the special advantage that they do not complicate the reaction by consuming the caustic alkali present, as is the case with the free acids, whose carboxylic radical portion reacts with the alkali to form the alkali metal salt. Experience indicates that sodium chloroacetate is the most satisfactory etherifying agent.

The amount of etherifying agent used depends upon the manner in which the etherification is being carried out. When the degree of substitution is controlled by limiting the quantity of etherifying agent, usually about twice the amount of etherifying agent theoretically necessary to give the desired amount of substitution is employed. When the degree of substitution is controlled by limiting the time through which the etherifying agent acts, the quantity thereof is controlled in accordance with the other features of the process.

The time required for the reaction varies with the amount of reagent used, the concentration of alkali, the type of products being prepared, and other variables. In general, however, it is difficult to get products of the proper solubility with reaction times of less than 6 hours at room temperature. Generally a reaction time of about 16 hours has been found satisfactory, although periods as long as several days at room temperature have been necessary to obtain proper solubility in some instances, particularly where the concentration of caustic alkali is low.

Ordinary normal room temperatures have been found the most satisfactory for the preparation of the alkali cellulose. The reaction is influenced considerably by the temperature. Generally temperatures at about ordinary normal room temperature (10°–35° C.) or slightly higher, are preferred. Under these conditions the etherification proceeds more readily, while degradation occurs to a diminished degree. Accordingly, under these conditions it is possible to obtain products of very high viscosity within the desired solubility range. The grease-proofing power of such products is outstanding. For this reason, the preferred range of etherifying temperatures is about 10°–40° C. Below this temperature range the reaction proceeds slowly, while at higher temperatures the reaction goes smoothly but degradation is pronounced and utilization of reagent is not desirably efficient.

The most satisfactory method of carrying out the reaction is to start with a commercial cellulose which has been degraded to some extent in its purification process and to treat it with the etherifying agent in the presence of an alkali, allowing the etherification to run to completion and continuing the accompanying oxidative degradation until the desired solubility has been obtained. In this process a halogen acetic acid etherifying agent for cellulose is usually allowed to react until more than 0.3 but less than 1.5 glycolic acid ether groups are introduced into the cellulose, the degradation being controlled so that the product has the proper solubility characteristics.

Generally the most desirable way to accomplish degradation is to allow the alkaline cellulose reaction mixture to stand in the presence of air before or after the etherification reaction, or while said reaction is taking place. An oxidative degradation apparently takes place under these conditions, which can be very easily controlled. However, degradation may be effected by other means, such as digestion of products or starting cellulose with acids or oxidizing agents. Oxidation catalysts may be added during the reaction. It will be apparent from the above and the specific examples how, as degradation and substitution are continued in the etherification reaction or otherwise, the solubility characteristics of the sodium salts of the cellulose glycolic acid ethers pass through various limits.

The degree of substitution obtained during the etherification can be controlled either by limiting the quantity of etherifying agent added to the reaction mixture or by limiting the time through which the etherifying agent is allowed to act. In the preferred embodiments of the invention the quantity of the etherifying agent is limited and after it is used up the degradation allowed to continue until a product of the desired solubility is obtained. The etherification reaction is stopped before the cellulose ether can be dissolved in water to form a neutral, smooth solution at concentrations of 2% or more by hand stirring.

After the steeping operation the alkali cellulose is pressed to remove excess alkali. The press ratio has not been found to be a critical variable in the preparation of these new cellulose derivatives. Press ratios of less than 3.3 are ordinarily used because it has been found that the best solubility is obtained in this way. When the larger quantities of ether groups are to be introduced it is sometimes preferable to exceed this press ratio range.

Following the pressing of the alkali cellulose, the sheets may be shredded to a fluffy form, or they may be mixed directly with the etherifying agent in a shredder or mixer of the Werner-Pfleiderer type. The shredded alkaline cellulose may be aged before adding etherifying agent, if desired, but it is usually more convenient to add the etherifying agent at once, and if ageing is required, to do this after or during the etherification (substitution), since the handling necessary in the procedure is thus reduced.

For many purposes it is desirable that the new cellulose glycolic acid ether be purified. A convenient purification and one which is generally applicable involves extracting the fibrous reaction mixture with a material which is a solvent for the remaining caustic and byproduct salts, yet which is not a solvent for the cellulose glycolic acid derivative. Methanol of about 70% concentration has these properties and is very good for this purpose. Washing is simplified if the caustic present is first neutralized with an acid which gives an alcohol-soluble alkali metal salt. Examples of such acids are acetic, propionic, lauric, levulinic and benzoic acids.

Another method of purification consists in first treating the fibrous reaction mixture to convert the cellulose glycolic acid to the aluminum salt. This can be accomplished by drowning the reaction mixture in a dilute solution (2%) of sulfuric acid containing a small quantity (1%) of an aluminum salt, for example, ordinary alum. The aluminum cellulose glycolate can be washed with water. This aluminum compound so obtained can be easily converted to the sodium salt by treatment with caustic soda solution. Other alkali metal hydroxide solutions behave similarly.

Still another method of purification involves drowning the reaction mixture in dilute (2%–10%) sulfuric acid containing sodium sulfate (5% to 10%). This converts the product to the free cellulose glycolic acid ether which can be washed (cautiously) with water.

The ease with which the cellulose glycolic acid ether of this invention can be purified gives it a distinct advantage over the cellulose glycolic acid ethers (water-soluble) known in the prior art, for such known products can be purified only by prolonged extraction with organic solvents. The peculiar solubility (the cellulose glycolic acid is insoluble in water, soluble in 6% aqueous sodium hydroxide at room temperature and is precipitated from 6% aqueous sodium hydroxide solutions upon neutralization of the free sodium hydroxide when present in a concentration greater than 3%) characteristics of the products of this invention and the smaller quantities of reagents used in its preparation make the purification more simple.

The water-soluble cellulose glycolic acids known to the prior art were dissolved in water simply by mixing them with the required amount of water and agitating by any convenient means, such as stirring with a paddle. The purified cellulose glycolic acids of this invention such as are obtained by the methanol extraction of the reaction mixture resulting from their formation when mixed with water and similarly agitated with a paddle, do not give solutions but gelatinous masses containing a large proportion of fibers which cannot be described in the language of the art as constituting a solution. These gelatinous masses or mixtures of the cellulose glycolic acid and water when subjected to unusual shearing forces such as those obtained in a colloid mill, give excellent solutions. The peculiar solubility of the products of this invention is their outstanding distinguishing characteristic.

While it is not desired to limit the invention to any particular theory, it may be stated (in the interest of making the invention more readily understood) that the high degree of disruptive action obtained by passing a suspension of the new cellulose glycolic acids in water through a colloid mill or other device capable of furnishing an equivalent vigorous mechanical attrition, is believed to result from a force sufficient to overcome the attractive forces of the cellulose molecules for each other. A similar action is obtained by subjecting the new cellulose glycolic acid derivative to powerful solvents therefor, such as aqueous caustic soda solution. Neutralization of the caustic alkali in the caustic soda solutions of the new cellulose glycolic acids leaves the new derivatives in solution.

The solubility of the products of this invention is improved considerably by purification. For most uses, however, the increased solubility is not essential except at the lower ranges of substitution. A convenient and practical method of preparing a solution of the new cellulose glycolic acids is to dilute the etherification reaction mixture with water. Usually sufficient caustic alkali is present to disperse the cellulose glycolic acid derivative. The solution can then be neutralized in concentrations of about 0.5% to 1% by the careful addition of an acid, for example, accompanied by vigorous agitation. It sometimes happens that precipitation occurs if the acid is added too rapidly without agitation.

The expression "dilute alkali" is used to cover sodium hydroxide concentrations of about 2% to 10% and other alkali of equivalent solvent and swelling action.

As an alternative to treating alkaline cellulose with a mono-halogen acetic acid derivative, the etherification can be effected by first mixing the cellulose with the etherifying agent followed by an addition of the caustic alkali. The etherifying agent may be added in small portions, or may be added all at once.

The products of this invention can also be used for most of the purposes which have been proposed for the water soluble alkali metal salts of the glycolic acid ethers of cellulose in the prior art. They are particularly satisfactory for the sizing of paper and textiles, the formation of films, the coating of fabrics, the making of adhesive compositions and the like. An outstanding use for the products of this invention is the preparation of greaseproof paper. None of the glycolic acid ethers of cellulose heretofore known can be used for such a purpose.

Example V illustrates the preparation of a chalk filled book paper using free pulps and a small amount of cellulose glycolic acid to obtain a product having the degree of water resistance and turpentine resistance called for in paper of this quality.

These products have many advantages in the fields of use already known for cellulose glycolic acids. The comparatively low degree of substitution of the products of this invention compared with those of the prior art water soluble products not only makes them cheaper to prepare but also easier to purify and to handle. The smaller quantities of reagent required for their preparation and the shorter time necessary for the reaction reduces costs. These last two features also permit the preparation of products of a considerably lower degree of degradation than is possible with the previously known higher substituted products. A low degree of degradation is especially important when it is desired to make high viscosity cellulose glycolic acids suitable for thickening, for the preparation of films having maximum strength and toughness, for the preparation of adhesive compositions, and the like.

The new sodium cellulose glycolate has been found to have outstanding advantages as a dispersing agent for pigments. Its effectiveness, together with its low cost which is comparable with that of other customary pigment dispersing agents, makes this material much more attractive for dispersing the pigments than the older, more expensive type of water soluble cellulose glycolic acid ether alkali metal salts.

The fact that these new cellulosic products are not dissolved by ordinary solution processes makes them of advantage for many purposes. For example, the product when applied to surfaces from water solutions followed by drying, is difficult to remove with vigorous agitation or scrubbing. This property is also of utility as a sticking agent for insecticides, which must be quite resistant to the washing action of rain. Mention may also be made of other uses such as clarifying agents for liquids. In aqueous solutions the products are of advantage as crystallization inhibitors. Their ability to form combinations with ammonium hydroxide and aluminum salts which become water insoluble upon drying, is an outstanding useful property. Solutions having these properties and yet being of low cost have long been desired in the industry.

As many apparently widely different embodiments of this invention may be made without departing from the spirit and scope thereof, it is to be understood that we do not limit ourselves to the specific embodiments thereof except as defined in the appended claims.

We claim:

1. The process which comprises treating cellulose with aqueous caustic alkali to produce alkali cellulose, substituting and degrading the cellulose by treating the alkali cellulose with carboxy-methylating agent to produce the alkali metal salt of cellulose glycolic acid, the etherification reaction being continued until the cellulose has been substituted with 0.3 glycolic acid residues per glucose unit and degraded to the extent that the sodium salt of the cellulose glycolic acid is soluble in 5% aqueous caustic soda solution at 10°–35° C. and is precipitated therefrom upon neutralization of the free caustic soda when present in concentrations greater than 2% but is not precipitated therefrom upon dilution with water to concentrations of less than 0.5% followed by neutralization of the free caustic soda with 5% aqueous acetic acid, and thereafter stopping the etherification reaction before the cellulose has been substituted beyond 1.5 glycolic acid residues per glucose unit and degraded to the extent that the sodium salt of the cellulose glycolic acid is soluble in water upon standing or hand stirring.

2. A coordinated substitution and degradation process for cellulose which comprises treating cellulose with a carboxy-methylating agent in the presence of aqueous caustic alkali, the substitution being stopped after the cellulose glycolic acid ether contains 0.3 glycolic acid groups but before it contains more than 1.5 glycolic acid groups per glucose unit, the degradation being stopped after the sodium salt of the cellulose glycolic acid is soluble in 5% aqueous caustic soda solution at 10°–35° C., is precipitated therefrom upon neutralization of the free caustic soda when present in concentrations greater than 2% and is not precipitated therefrom upon dilution with water to concentrations of less than 0.5% followed by neutralization of the free caustic soda with 5% aqueous acetic acid, but before the sodium salt of the cellulose glycolic acid is soluble in water upon standing or hand stirring.

3. A process for preparing cellulose glycolic acid ethers, which comprises degrading and etherifying cellulose until the sodium salt of the cellulose ether produced is soluble in 5% aqueous caustic soda solution at 10°–35° C., is precipitated therefrom upon neutralization of the free caustic soda when present in concentrations greater than 2% and is not precipitated therefrom upon dilution with water to concentrations of less than 0.5% followed by neutralization of the free caustic soda with 5% aqueous acetic acid but does not dissolve in water upon standing or hand stirring, the etherification being obtained by reacting the cellulose with a carboxy-methylating agent in the presence of aqueous caustic alkali until 0.3 to 1.5 glycolic acid residues per glucose unit have been substituted.

4. A process for preparing the sodium salts of cellulose glycolic acid ethers, which comprises degrading and etherifying cellulose until the sodium salt of the cellulose ether produced is soluble in 5% aqueous caustic soda solution at 10°–35° C., is precipitated therefrom upon neutralization of the free caustic soda when present in concentrations greater than 2% and is not precipitated therefrom upon dilution with water to concentrations of less than 0.5% followed by neutralization of the free caustic soda with 5% aqueous acetic acid but does not dissolve in water upon standing or hand stirring, the etherification being obtained by reacting the cellulose with sodium chloro-acetate in the presence of aqueous caustic soda until 0.3 to 1.5 glycolic acid residues per glucose unit have been substituted.

5. An alkali metal salt of the cellulose glycolic acid ether produced by the process of claim 3.

6. The sodium salt of cellulose glycolic acid obtained by the process of claim 4, said sodium salt dissolving to a smooth solution upon colloid milling it with water in concentrations less than about 0.5%.

7. A coordinated substitution and degradation process for cellulose which comprises treating cellulose with a carboxy-methylating agent in the presence of aqueous caustic alkali, the substitution being continued until the cellulose ether contains at least 0.3 glycolic acid groups but stopped before it contains more than 1.5 glycolic acid groups per glucose unit, the degradation being continued until the sodium salt of the cellulose glycolic acid is soluble in 5% aqueous caustic soda solution at 10°–35° C., is precipitated therefrom upon neutralization of the free caustic soda when present in concentrations greater than 2%, but not precipitated therefrom upon dilution with water to concentrations of less than 0.5% followed by neutralization of the free caustic soda with 5% aqueous acetic acid, and stopped before the sodium salt of the cellulose glycolic acid becomes soluble in water upon standing.

8. The sodium salt of cellulose glycolic acid obtained by the process of claim 7, said sodium salt dissolving to a smooth solution upon colloid milling it with water in concentrations less than about 0.5% and forming smooth solutions when the gel formed by colloid milling it with water in concentrations greater than about 0.5% is diluted with water to concentrations of 0.5%.

ROBERT WILLIAM MAXWELL.
LOUIS LEONARD LARSON.